July 5, 1938. G. GARAND Re. 20,779

LOCKING PIN FOR BRAKE SHOES

Original Filed April 19, 1935

INVENTOR
George Garand,
BY Ralph T. Bassett,
ATTORNEY

Reissued July 5, 1938

Re. 20,779

UNITED STATES PATENT OFFICE 20,779

LOCKING PIN FOR BRAKE SHOES

George Garand, Rouses Point, N. Y.

Original No. 2,061,964, dated November 24, 1936, Serial No. 17,345, April 19, 1935. Application for reissue February 9, 1938, Serial No. 189,587

17 Claims. (Cl. 188—243)

This invention relates to improvements in brake-shoe assemblies. Assemblies of this character include a brake-shoe provided with spaced lugs, a supporting head formed with recesses for receiving the lugs of the brake-shoe and a locking pin which extends through registering openings in the lugs of the brake-shoe and the supporting head for locking the parts together. Heretofore difficulty has been experienced in providing a locking pin for use in brake-shoe assemblies which would not become displaced due to vibration of the parts, as the accidental removal of a pin and the loss of a brake-shoe might readily result in material damage to both life and property.

The present invention comprehends a locking pin structure designed for use in the conventional brake assemblies, which, when in locking position, cannot be displaced due to vibration or other reasons apparent to one skilled in the art. More specifically the present locking pin includes an integral structure the elongated shank of which is shaped to seat in the registering openings formed in the shoe and in the supporting head, while the upper portion is curved outwardly and downwardly to form an intermediate handle portion and a spring lock arm, the latter cooperating with the supporting head to prevent displacement.

Other features will more clearly hereinafter appear by reference to the accompanying drawing forming a part of this specification and wherein like characters of reference designate corresponding parts throughout the several views, in which.

Figure 1:
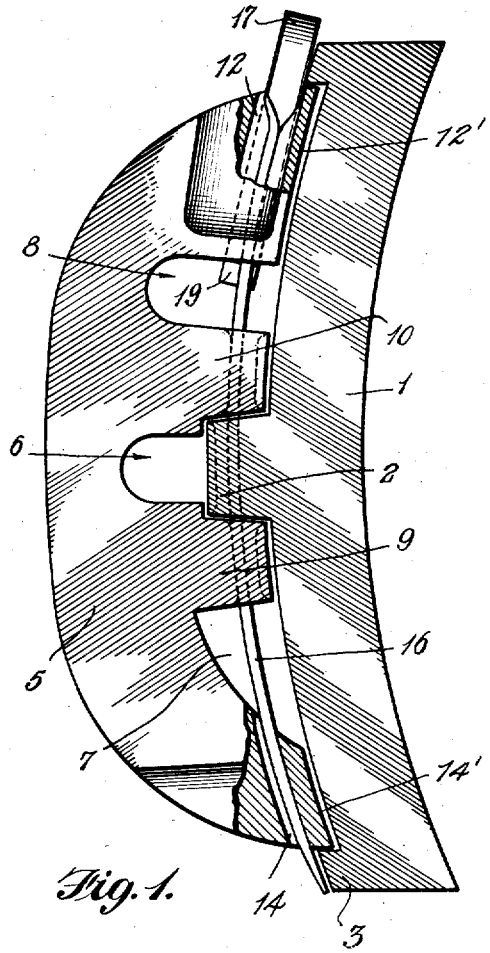
Figure 1 is a side elevation of a brake assembly with the pin in position.

In the present disclosure a conventional brake-shoe is illustrated at 1, and includes a plurality of spaced lugs shown in the illustration to include intermediate lug 2 and end lugs 3. The supporting head 5 is provided with a central recess 6 and end recesses 7 and 8, these recesses defining the projections 9 and 10 between which the central lug 2 of the brake-shoe 1 is positioned in normal assembly. Aligned longitudinally extending openings are formed through the inter-locked lug and extensions. Also the extremities of the supporting head are formed with central longitudinal slots 12 and 14 and longitudinal ribs 12′ and 14′ projecting inwardly from the end lugs 3 seat in these slots to eliminate transverse relative movement of the parts. The foregoing defines generally the essential parts of one of the conventional types of brake-shoes and supporting head structures.

Figure 3:
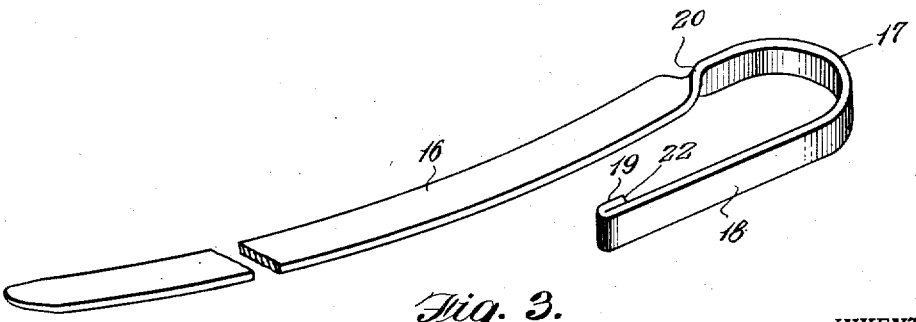
Figure 3 is a perspective of the locking pin.

Referring now particularly to Figure 3, the locking pin will be seen to comprise an integral metallic body, preferably spring steel, and includes an elongated shank 16, a curved handle 17, a locking shank arm 18 and hooked extremity 19. The shank of the locking pin is curved slightly and tapers gradually at its extremity. At a point defining the upper extremity of the locking pin the body is twisted at right angles as shown at 20 and is curved outwardly and downwardly in inverted U-form to provide the handle portion 17 and the locking shank arm 18. The locking shank arm 18 is positioned laterally of the pin body 16 a distance approximating the space between the wall of the slot in the upper projection of the supporting head and the side face of this element. The hooked extremity or projection 19 of the locking shank 18 is formed by bending the end portion of the shank inward upon itself into flat face engagement with the main body portion of the shank. The square end edge of the hooked extremity thus forms a shoulder or lug member 22 for locking the pin to the supporting head 5 as hereinafter pointed out.

Figure 2:
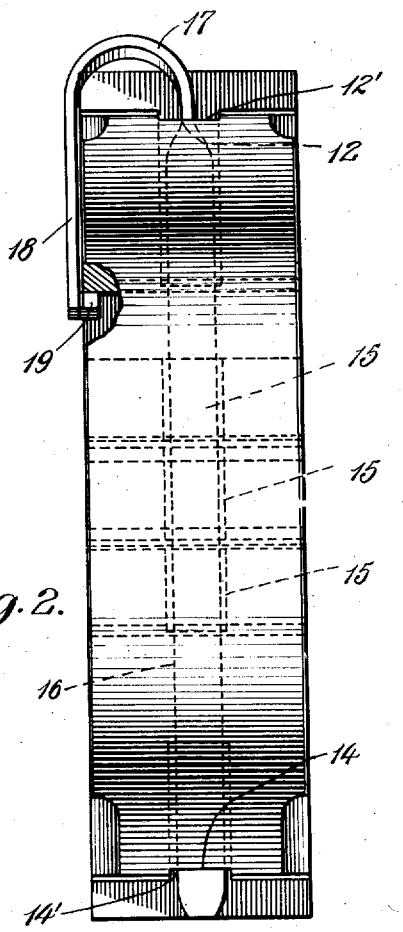
Figure 2 is a rear elevation.

The improved locking pin serves to securely lock the brake-shoe 1 to the supporting head 2, as shown in Figures 1 and 2, the elongated shank 16 thereof being accommodated in and extending through the opening of the lug 2 of the shoe and the openings of the projections 9 and 10 and slots 12 and 14 of the supporting head, and the shank 18 thereof overlying the side of the head 5 with the shoulder 22 of the hooked extremity 19 locked underneath the shoulder provided by the flat faced upper wall of the recess 8 of the head 5.

As will be evident, due to the resilient nature of the structure, the arm or shank 18 is pressed into engagement and has a firm grip on the side of the head 5 and retains the shoulder 22 engaged beneath the shoulder formed by the upper wall of the recess 8. The pin is thus effectively locked against accidental removal by the shoulder 22 and it is further impossible to remove the same without first disengaging the shoulder 22 from the cooperating shoulder of the head 5 by forcibly flexing the arm or shank 18 of the pin laterally outwardly away from the head.

Normal vibration of the parts which might eventually tend to increase the play between contacting faces and thus increase the movement of the shank will not affect the locking engagement of the head 19 beneath the lower face of the upper extremity of the supporting head as the locking shank 18 due to the inverted U-shaped intermediate spring portion 17 will accommodate such wear and continue to seat fully beneath the wall face. The intermediate portion 17 not only functions to create the necessary resiliency in the locking shank 18 but provides a convenient element in the nature of a handle for use in inserting and removing the structure.

In securing the brake-shoe to the supporting head by means of my improved locking pin, assuming that the shoe 1 has been placed on the head 5, as shown in Figures 1 and 2, with the lugs and projections of the same engaged with each other, the pin is applied from above the head and shoe, inserting the shank 16 thereof downwardly through the openings of the lugs and projections of the head and shoe and forcing the pin home to the position shown in said figures. In forcing the pin downwardly, the laterally offset arm or shank 18 rides downwardly over the outer side face of the upper portion of the head 5, this shank being flexed outwardly during this movement due to camming action on said outer side face of the hooked or enlarged extremity 19 of the shank. This outward flexing is facilitated through the spreading action produced as the rounded end face provided by the curved section of the hooked extremity is forced over the top of the supporting head. When the pin has been forced home, the shoulder 22 of the shank 18, due to the resiliency of the material of the pin and the spring action of the curved handle section 17 thereof, snaps into locking engagement beneath the shoulder provided by the upper wall of the opening 8 of the head 5.

To disconnect the pin to unlock the brake shoe from the head 5, the lower end of the locking arm or shank 18 of said pin is first pried laterally outwardly to clear the shoulder 22 thereof from the cooperating shoulder of the head 5 and thereby unlock the pin from the head to permit its endwise removal. After the pin has been thus unlocked, to complete the operation the same is withdrawn in an upward direction from operative engagement with the head 5 and shoe 1, thus freeing the shoe for removal from the head.

Inasmuch as the arm or shank 18 of the pin overlies the outer side of the head 5, it is completely exposed, thus rendering it freely accessible for manipulation in unlocking the shouldered end thereof from the head. The pin while effectively locked by shouldered latching engagement with the head is thus made readily and quickly removable.

Minor details of construction can be made without departing from the spirit of the invention which comprehends broadly the use of an integral structure in the form of a locking pin having an offset latch portion at one extremity for resilient hooked engagement with a suitable coacting wall portion. The structure of the pin as shown and defined provides a structure which will be comparatively simple and cheap to manufacture and which while incorporating the desirable features of the prior art add to those features a lock of such a character that its positive action will not be defected by wear between the intermediate inter-fitting parts.

It is, of course, comprehended that locking pins shall be made with the locking extremity projecting to either side of the pin shank to permit use of the device on both right and left hand brake-shoe assemblies.

I have herein shown and described what I now consider the preferred manner of carrying out my invention, but the same is merely illustrative and I contemplate all changes and modifications that come within the scope of the claims appended hereto.

I claim:

1. In a device of the character described, the combination with a brake-shoe supporting head having attaching lugs, said head having a locking shoulder on one side thereof; of a brake-shoe having a cooperating attaching lug; and a key of resilient material extending through said lugs, said key having a spring arm exterior to said head, said arm having a locking shoulder engaged with the shoulder of said head to latch said key against removal.

2. In a device of the character described, the combination with a brake-shoe supporting head; of a brake-shoe, said shoe and head having interengaging attaching lugs, said head having a shoulder at one side thereof; and a key having a shank extending through said lugs, said shank having a spring arm exterior to said head in overhanging relation to the shouldered side of said head, said spring arm having a shoulder pressed into locking engagement with the shoulder of said head through the inherent resiliency of said spring arm.

3. In a device of the character described, the combination with a brake-shoe supporting head; of a brake-shoe, said shoe and head having cooperating attaching lugs thereon, said head having a laterally inwardly opening recess in one side thereof, said recess providing a locking shoulder; and a key having a shank of resilient material extending through said lugs for locking the shoe to the head, said shank having one end thereof bent reversely and extending into overlying relation to the side of said head, said overlying portion having a shoulder thereon held yieldingly interlocked with the shoulder of said head.

4. In a device of the character described, the combination with a brake-shoe supporting head; of a brake-shoe, said shoe and head having cooperating attaching lugs thereon, said head having laterally inwardly opening recesses at opposite sides thereof providing shoulders; and a locking key of spring material, including an elongated shank extending through said lugs to lock the shoe to the head, a resilient arm spaced throughout its length from said shank and overlying one side of said head, said arm having a shouldered end portion engaged beneath the shoulder at the corresponding side of the head and held yieldingly engaged through the inherent resiliency of said arm.

5. In a device of the character described, the combination with a brake-shoe supporting head; of a brake-shoe, said shoe and head having cooperating attaching lugs, and said head having a locking shoulder on one side thereof; a locking pin of spring material including an elongated body portion extending through said lugs, said elongated body portion having one end thereof protruding from said head, and extending into overlying relation to the side of said head, said overlying portion having a projection thereon in interlocking shouldered engagement with the locking shoulder of said head.

6. A locking pin for brake-shoes, said pin being formed of spring material and comprising an elongated body portion and a rebent portion of less length than the body portion and spaced therefrom throughout its length, said rebent portion having an inwardly projecting locking shoulder thereon.

7. A locking pin for brake-shoes including an elongated shank and a resilient arm connected to said shank and spaced throughout its length from said shank, said arm having a locking projection thereon.

8. A locking pin for brake-shoes including an elongated shank, a resilient arm spaced throughout its length from said shank having a hooked extremity and a connection between said shank and arm.

9. A locking pin for brake-shoes comprising an integral resilient body formed with an elongated shank, said body being twisted to right angles to define the upper extremity of said shank and curved outwardly and downwardly to form a spaced locking arm, and a hook carried by said locking arm.

10. A locking pin for brake-shoes including an elongated resilient metallic member bent to provide spaced long and short arms and an inverted U-shaped intermediate portion, the long arm being slightly curved and tapered at its extremity and the short arm being bent to form a hook.

11. The substance of claim 10 characterized in that the portion of the resilient metallic member intermediate the long and short arms is curved to provide a handle portion.

12. In combination with a brake-shoe having attached lugs, a supporting head formed with recesses to receive said lugs, a locking pin extending through the brake-shoe and head and formed with an offset downwardly extending portion, the downwardly extending portion being twisted substantially to right angles with the locking pin and terminating in an integral hook and a handle positioned between the locking pin and the downwardly extending portion.

13. A locking pin for brake-shoes comprising a body having a spaced rebent portion of less length than the body and terminating in an inwardly projecting hook.

14. The substance of claim 13 characterized in that the hook is formed by bending the short arm end portion inwardly upon itself.

15. In combination with a brake-shoe having attaching lugs, a supporting head formed with recesses to receive said lugs, a locking pin extending through the brake-shoe and head having a rebent portion terminating in a hook for engagement with the outer face of said supporting head.

16. A locking pin for brake-shoes comprising a body having a spaced rebent portion and a hook carried by the rebent portion extending inwardly toward the body.

17. In combination with a brake-shoe having attaching lugs, a supporting head formed with recesses to receive said lugs, a locking pin including an elongated body extending through the brake-shoe and head and formed with a downwardly extending portion spaced from the body, said downwardly extending portion being bent upon itself to provide a hook for engagement with said head.

GEORGE GARAND.